No. 710,083. Patented Sept. 30, 1902.
G. STERN.
ELECTRIC METER.
(Application filed Dec. 11, 1900.)

(No Model.)

Witnesses:
Lewis B. Abell
Benjamin B. Hull

Inventor:
George Stern,
by Albert G. Davis
Atty.

UNITED STATES PATENT OFFICE.

GEORGE STERN, OF CHARLOTTENBURG, GERMANY, ASSIGNOR TO THE GENERAL ELECTRIC COMPANY, A CORPORATION OF NEW YORK.

ELECTRIC METER.

SPECIFICATION forming part of Letters Patent No. 710,083, dated September 30, 1902.

Application filed December 11, 1900. Serial No. 39,524. (No model.)

*To all whom it may concern:*

Be it known that I, GEORGE STERN, a subject of the Emperor of Germany, residing at Charlottenburg, Germany, have invented certain new and useful Improvements in Electric Meters, (Case No. 1,794,) of which the following is a specification.

My invention relates to alternating-current meters of the induction type, and has for its object to so organize such a meter that when applied to a three-phase system the loss of energy in the shunt-circuit will be a minimum.

The induction-meter when used for measuring the energy consumed in a balanced three-phase system comprises one or more main-current windings and a shunt winding or windings supplied with a current which on non-inductive load produces a magnetic field which is shifted in phase ninety degrees behind the field due to the main current, the said windings operating together upon a movable metallic body or armature.

In one of the constructions that has been heretofore used two main field-windings are provided, each connected in circuit with one of the three-phase mains, and the shunt-winding is connected between the mains in which the main-current windings are connected, so that the required ninety-degree relation is obtained when the shunt-circuit itself brings about no perceptible phase shifting due to its self-induction. The energy consumed in the shunt-circuit with such an arrangement is, however, a maximum, the actual watts consumed being equal to the apparent watts. In order to reduce the consumption of energy, it has been attempted to so connect the windings that the required ninety-degree relation may be produced with a shunt-circuit having a considerable self-induction, so that the current in the said shunt-circuit will lag behind its electromotive force, and one system has been devised in which a shunt-circuit having a sixty-degree phase displacement between the current and electromotive force is employed.

By my invention I am enabled to make use of a shunt-circuit so organized that the current therein is displaced by ninety degrees behind its electromotive force, any of the well-known means for producing such a phase shifting being employed. The consumption of energy in the shunt-circuit is therefore reduced to a minimum.

My invention will be better understood by reference to the following specification when taken in connection with the accompanying drawings, while its scope will be pointed out in the appended claims.

Figure 1:
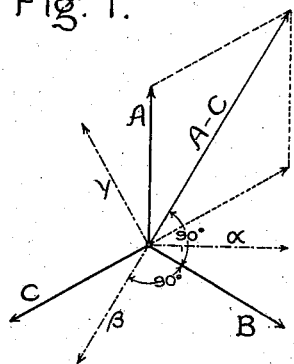
Figure 2:
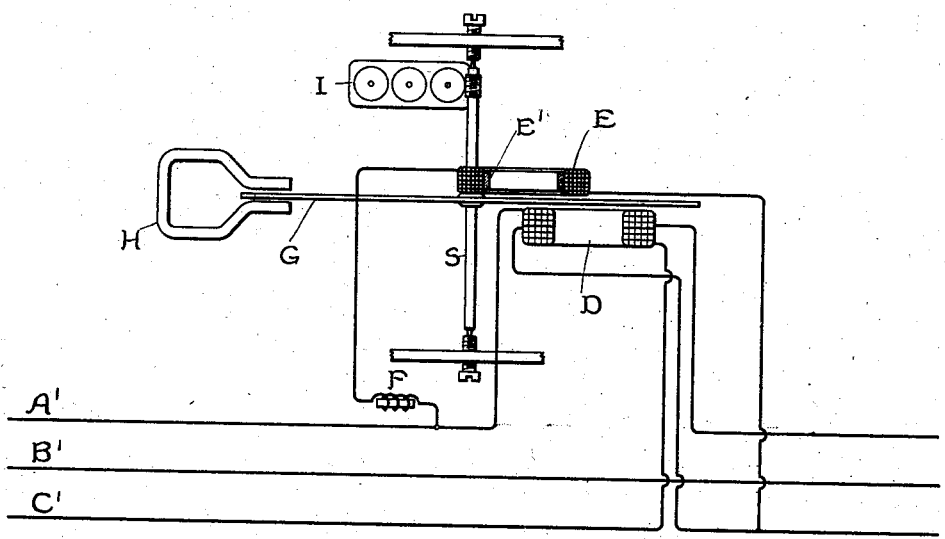
Figure 3:
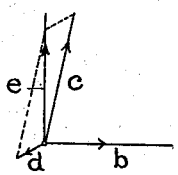

In the drawings, Figure 1 is a diagram illustrating the phase relations of the currents in the meter-windings. Fig. 2 is a diagrammatic representation of a meter having its windings connected according to my present invention. Fig. 3 is a diagram illustrating one method for obtaining the required ninety-degree relation in the shunt-circuit.

In Fig. 2, A', B', and C' represent the three mains of a three-phase system, the phase relations of the currents flowing in the several mains being indicated by the lines A, B, and C in the diagram of Fig. 1. The dotted line $\alpha$ $\beta$ $\gamma$, Fig. 1, indicate the phase relations of the electromotive forces between the several mains. The main-current winding of the meter, which is diagramatically illustrated in Fig. 2, comprises a single coil D, consisting of two sections, one of which is connected in circuit with the main A' and the other of which is reversely connected in the circuit C', the resultant field due to these two windings being indicated by the line A C, Fig. 1. This line is displaced by one hundred and eighty degrees from the line $\beta$, which indicates the phase of the potential between the mains A' and C'. For the purposes of my invention, then, it is only necessary to connect a shunt-winding across points the potential between which is in phase with the resultant of the currents flowing in the sections of the main-current winding on non-inductive load and to introduce into the circuit of the said winding any suitable means for causing the current in the shunt-circuit to lag by ninety degrees behind its impressed electromotive force. The mains A' and C' fulfil the conditions above specified, and it will be evident from an inspection of Fig. 1 that with the shunt-winding connected between the mains A' and C' the magnetic field due to the shunt-winding will lag by ninety degrees behind the potential $\beta$ and will be displaced by ninety degrees from the resultant magnetic field due to the main-current windings included in the mains A' and C'.

In the particular arrangement which I have illustrated the shunt-winding comprises a main coil E, which is connected in series with a self-induction F and therefore is traversed by a current which is displaced by nearly ninety degrees behind its impressed electromotive force and an auxiliary short-circuited coil E' in inductive relation thereto. The two coils acting together produce a magnetic field lagging by ninety degrees behind the electromotive force impressed on the shunt-circuit. This particular arrangement of windings is shown in Patent No. 548,231 to Shallenberger and is illustrated here merely for the purpose of showing one means for carrying out my invention, it being understood that any desired arrangement for obtaining the ninety degrees displacement may be used.

Fig. 3 is a diagram showing the phase relations of the currents in the two shunt-coils E and E'. In this figure, $b$ indicates the phase of the electromotive force between the mains A' and C', $c$ indicates the phase of the current in the circuit containing the induction-coil F and the coil E, and $d$ indicates the phase of the current in the short-circuited coil E'. The resultant of these two currents, and therefore the resultant magnetization due to the two shunt-coils, has a phase relation (indicated by the line $e$) which is displaced by ninety degrees from the line $b$.

The meter indicated in Fig. 2 is of the disk type, the disk G being mounted upon a shaft $s$, which is connected with an indicating mechanism I. For a retarding means a permanent magnet H is used, having its poles including a portion of the armature-disk at a point removed from the actuating-windings.

It will be evident that other connections than those shown in the drawings may be used for the purpose of my invention, it being only essential that the windings shall be so connected as to require a shunt-field displaced by ninety degrees from the electromotive force impressed on the shunt-circuit.

What I claim as new, and desire to secure by Letters Patent of the United States, is—

1. In an induction-meter for three-phase circuits, a main-current winding consisting of a single coil comprising a plurality of sections suitably connected to the three-phase mains, a shunt-winding connected across points, the potential between which is in phase with the resultant of the currents in the sections of the main-current winding on non-inductive load, and means for causing the magnetic field due to the shunt-winding to be displaced by substantially ninety degrees from the electromotive force impressed upon the shunt-circuit.

2. In an induction-meter for three-phase circuits, a main-current winding consisting of a single coil comprising a plurality of sections each connected in circuit with one of the three-phase mains, a shunt-winding connected between two of the mains, and means for causing the field due to the shunt-winding to be displaced by substantially ninety degrees from the electromotive force impressed upon the shunt-circuit.

3. In an induction-meter for three-phase circuits, a main-current winding consisting of a single coil comprising two sections each connected in circuit with one of the three-phase mains, a shunt-winding connected between the mains in which the series sections are included, and means for causing the field due to the shunt-winding to be displaced by substantially ninety degrees from the electromotive force impressed on the shunt-circuit.

In witness whereof I have hereunto set my hand this 23d day of November, 1900.

GEORGE STERN.

Witnesses:
 HENRY HASPER,
 WOLDEMAR HAUPT.